(12) United States Patent
Penn et al.

(10) Patent No.: US 9,919,382 B2
(45) Date of Patent: *Mar. 20, 2018

(54) CLADDING APPARATUS AND METHOD

(71) Applicant: Alabama Specialty Products, Inc., Munford, AL (US)

(72) Inventors: Wayne M. Penn, Anniston, AL (US); Donald G. Johnson, Munford, AL (US)

(73) Assignee: Alabama Specialty Products, Inc., Munford, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,875

(22) Filed: Jan. 12, 2017

(65) Prior Publication Data

US 2017/0120383 A1 May 4, 2017

Related U.S. Application Data

(62) Division of application No. 14/266,358, filed on Apr. 30, 2014, now Pat. No. 9,586,289.

(51) Int. Cl.
| | |
|---|---|
| *B05B 7/16* | (2006.01) |
| *B05B 5/00* | (2006.01) |
| *B23K 26/34* | (2014.01) |
| *C23C 26/02* | (2006.01) |
| *B23K 26/348* | (2014.01) |
| *B23K 26/06* | (2014.01) |
| *B23K 26/70* | (2014.01) |

(Continued)

(52) U.S. Cl.
CPC ............... *B23K 26/34* (2013.01); *B05B 7/10* (2013.01); *B23K 26/0643* (2013.01); *B23K 26/0648* (2013.01); *B23K 26/348* (2015.10); *B23K 26/703* (2015.10); *C23C 26/02* (2013.01); *B23K 2203/26* (2015.10)

(58) Field of Classification Search
USPC ........ 118/300, 302, 305, 641–643, 663, 665, 118/679–681; 219/615, 633, 121.6, 219/121.61, 76.1–76.17
See application file for complete search history.

(56) References Cited

U.S. PATENT DOCUMENTS

| | | | | |
|---|---|---|---|---|
| 4,698,480 A | * | 10/1987 | Klingel | ... B21D 28/12 |
| | | | | 219/121.39 |
| 6,064,034 A | * | 5/2000 | Rieck | ... B23K 26/032 |
| | | | | 219/121.84 |
| 9,586,289 B2 | * | 3/2017 | Penn | ... B23K 26/0665 |

(Continued)

*Primary Examiner* — Yewebdar T Tadesse
(74) *Attorney, Agent, or Firm* — Richard L. Vail; Russel O. Primeaux; Kean Miller LLP

(57) ABSTRACT

The inventions disclosed by this application are for a cladding apparatus, a cladding head, and a method of cladding a relatively planar solid object such as a boiler waterwall. Cladding of non-horizontal surfaces is complicated by the effects of gravity as melted clad material trends to runoff the surface before the cladding material bonds to the appropriate location. The disclosed inventions overcome these limitations by controlling the relative angle of application by either rotating the workpiece or the cladding head through a pre-programmed sequence. Also presented in a compact design for a laser cladding head that facilitates such cladding by minimizing movement of the laser fiber and improves cladding speed over irregular shaped objects.

11 Claims, 13 Drawing Sheets

(51) Int. Cl.
  *B05B 7/10*   (2006.01)
  *B23K 103/18*   (2006.01)

(56) References Cited

U.S. PATENT DOCUMENTS

| | | | | |
|---|---|---|---|---|
| 2006/0255019 A1* | 11/2006 | Martukanitz | ...... | B23K 26/0648 |
| | | | | 219/121.64 |
| 2010/0096370 A1* | 4/2010 | Yamazaki | ............ | B23K 26/046 |
| | | | | 219/121.67 |
| 2013/0233836 A1* | 9/2013 | Dackson | ............ | B23K 26/1476 |
| | | | | 219/121.64 |

* cited by examiner

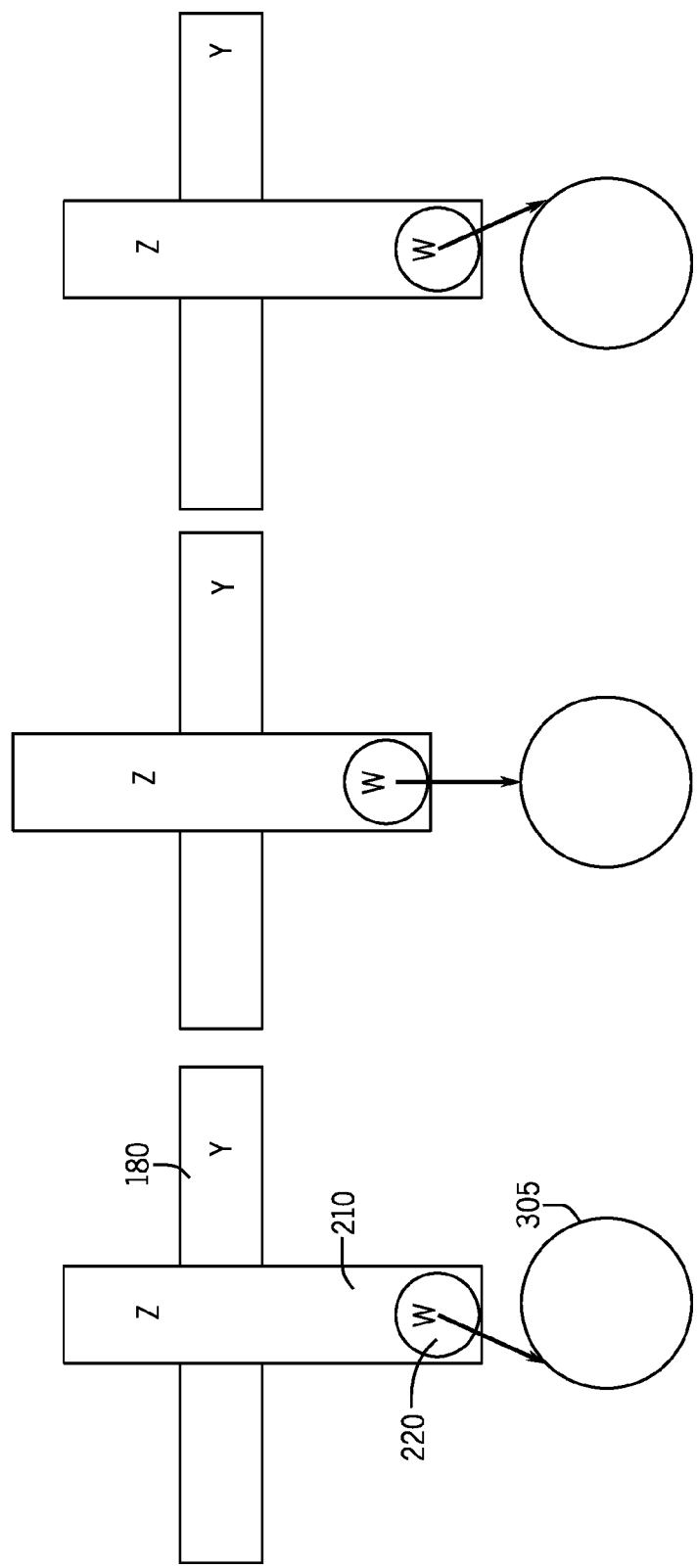

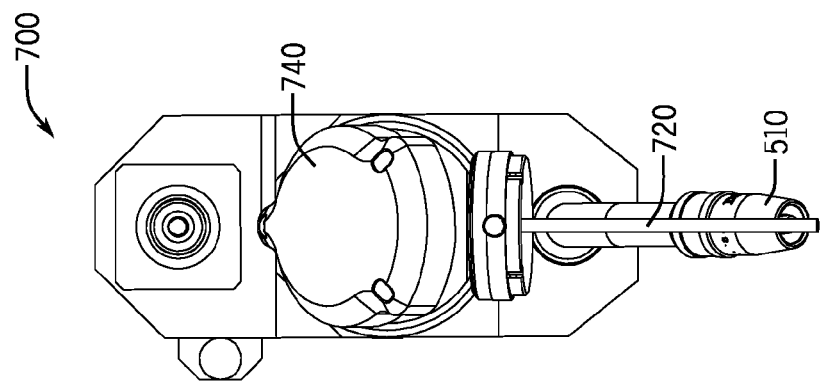
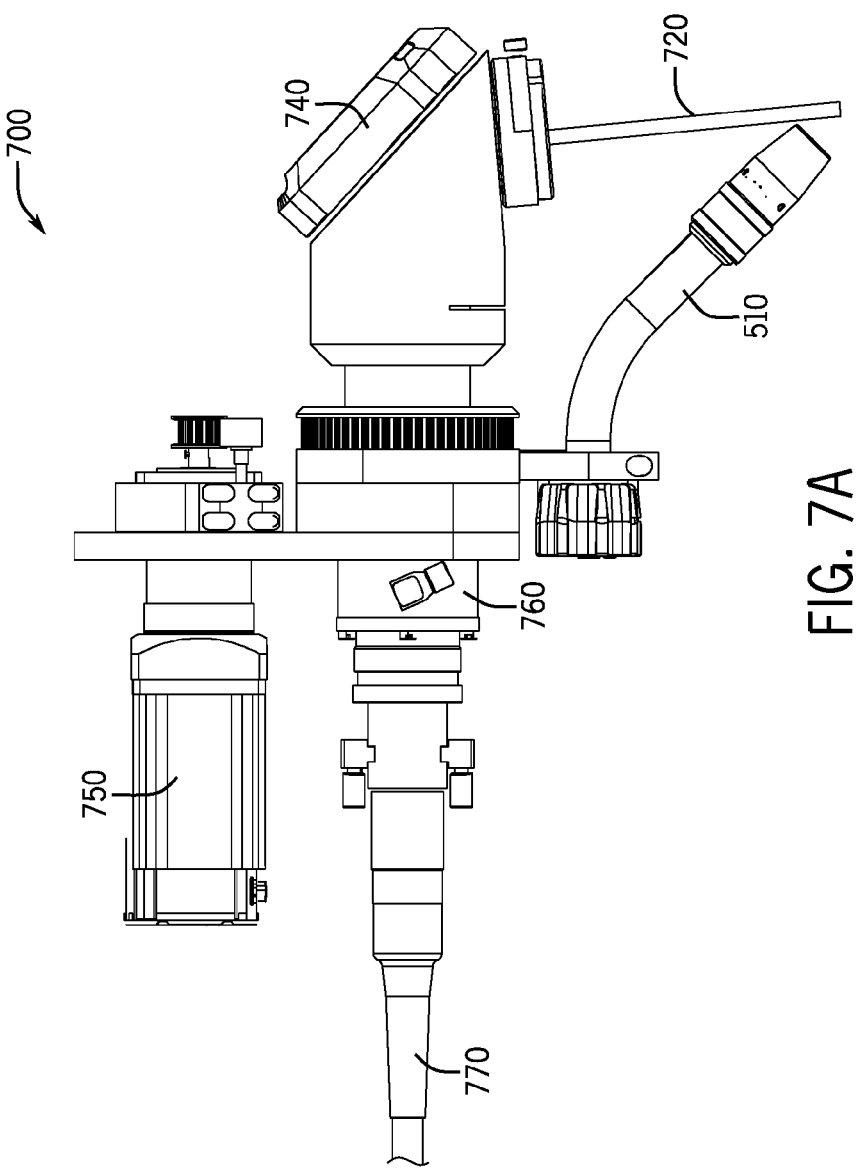

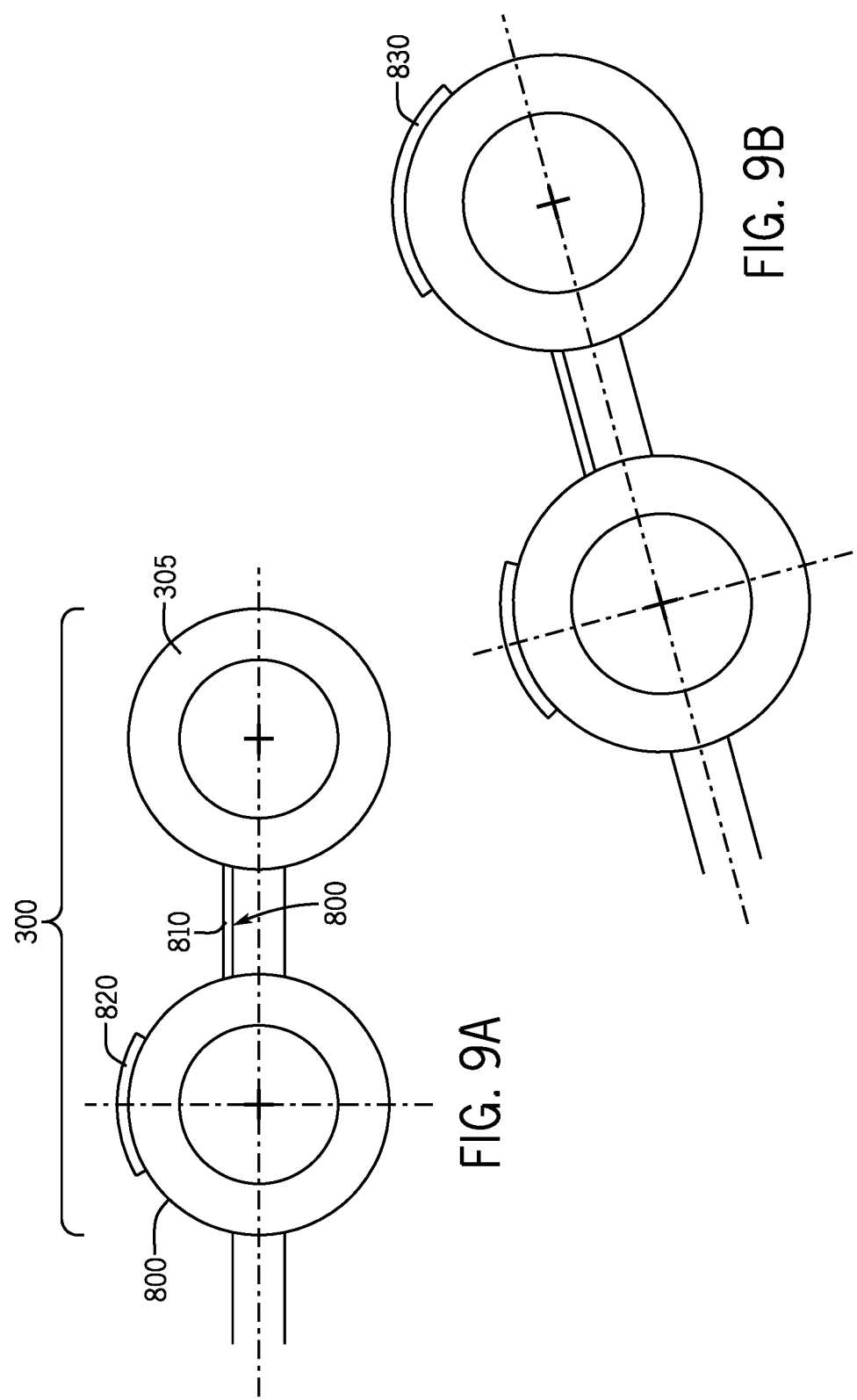

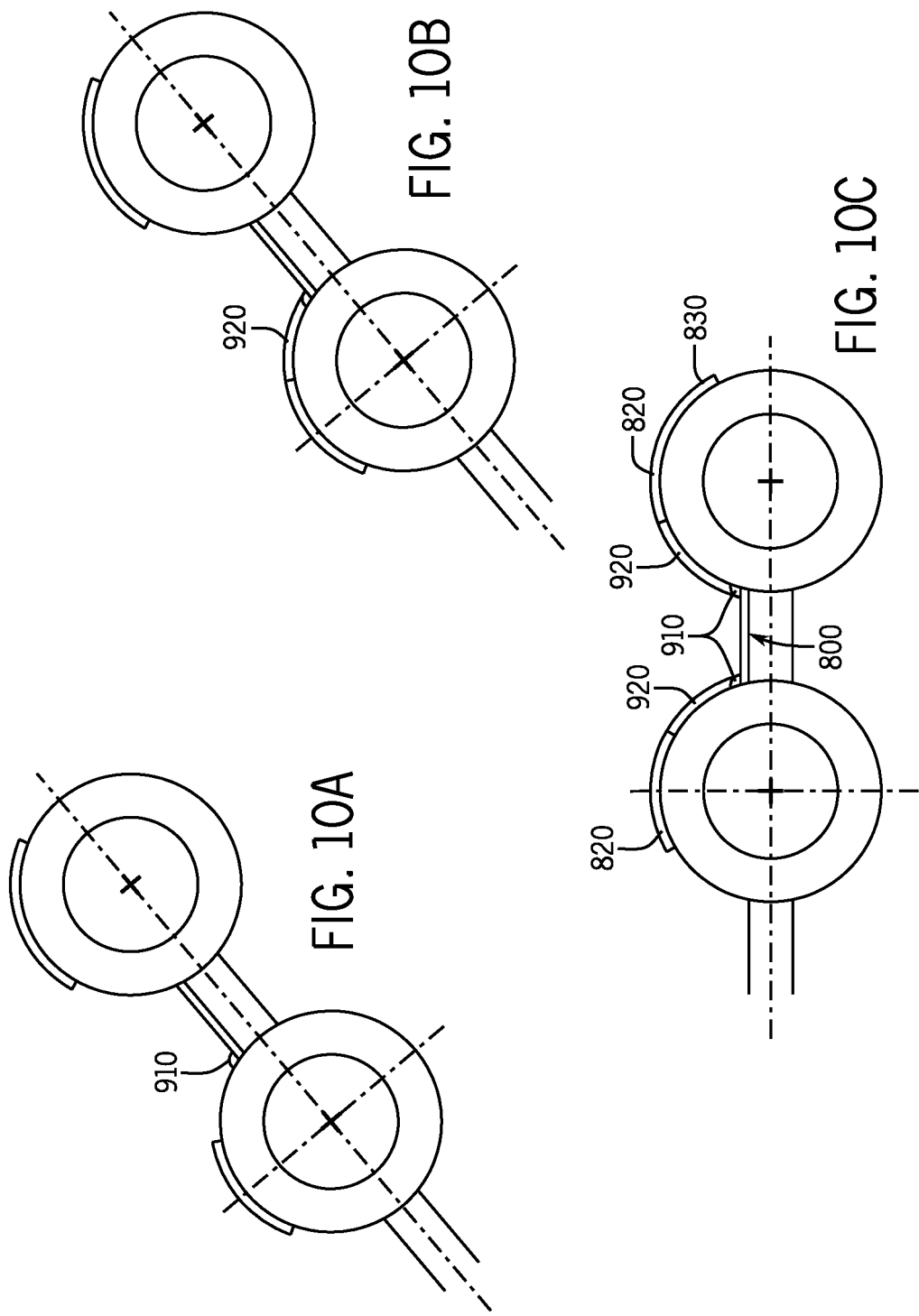

CLADDING APPARATUS AND METHOD

CROSS REFERENCE TO RELATED APPLICATIONS

This application is a divisional of U.S. non-provisional application Ser. No. 14/266,358 filed on Apr. 30, 3014. The disclosures of the referenced application are hereby incorporated herein in their entirety by reference.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BACKGROUND

Embodiments disclosed herein may be used to add alloy cladding to the exterior of relatively planar solid structures such as boiler waterwalls. Whereas cladding a flat sheet of metal, laying in the horizontal position, is relatively simple, the ability to clad non-flat structures such as waterwall is enhanced through application of the apparatus and method disclosed herein. Cladding of boiler waterwalls presents a challenge as a portion of each boiler tube extends outward from what would otherwise resemble a flat sheet of metal. Such a structure contains features (surfaces) with points whose tangents are not horizontal (when the structures are laid flat). Cladding non-horizontal structures is more difficult as gravity may cause cladding material to run and not bond to the appropriate location.

Combustion units such as boiler and furnaces combusting coal or refuse may experience issues with corrosion. Use of nitrogen oxide (NOx) reduction strategies often require combustion in low excess oxygen environments that result in corrosive conditions. Cladding the boiler waterwalls with alloys is an efficient method of controlling corrosion under such circumstances.

This application presents embodiments of a cladding apparatus that facilitates efficient application of alloy cladding to structures which have raised or sloped features such as waterwalls. This application also discloses a compact cladding head with features that enhance the ability to clad irregularly shaped solid bodies. Also presenting within this application are methods of efficiently cladding such structures using the apparatus disclosed herein.

BRIEF DESCRIPTION OF THE DRAWINGS

FIG. 5A shows a conceptual model that demonstrates the initial, middle, and final positions of the cladding head using a pendulum scanner.

FIG. 7A and 7B shows two side views the cladding device and head.

FIGS. 9A and 9B show the initial best mode sequence for cladding the two outermost tubes in a boiler waterwall.

FIGS. 10A and 10B, show the subsequent best mode steps for cladding the two outermost tubes in a boiler waterwall.

FIG. 10C demonstrates all the various passes taken to complete cladding the two outer walls on either side of the waterwall panel.

DETAILED DESCRIPTION

PARTS LIST

Figure 1:
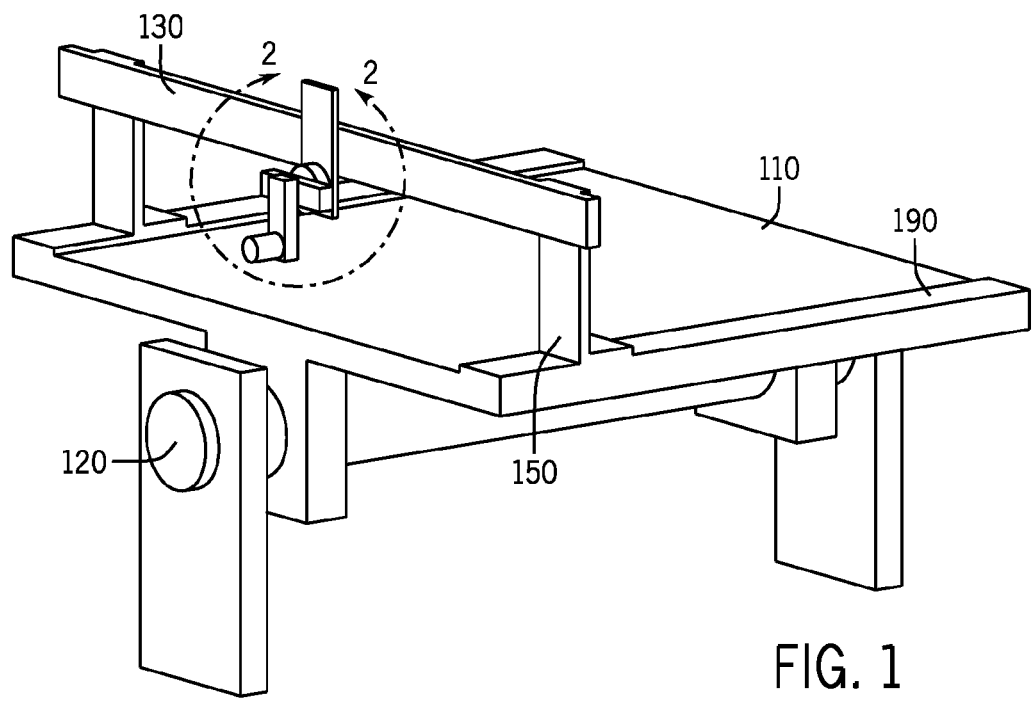
FIG. 1 shows a conceptual isometric side view of the cladding system.

Cladding process system 100
Rotary table 110
Rotary table axis 120
Gantry 130
Gantry supports 150
Carriage 160
Main rotary 170
Horizontal slide 180
Track 190
Vertical slide 210
Cladding head 220
Waterwall 300
Waterwall tube 305
Rotary table backbone 310
Backbone face 320
Backbone blade 330
Clamp 340
Pendulum scanner 500
Torch 510
Oscillating axis 520
Initial virtual pivot point 610
First layer of clad 620
Second virtual pivot point 630
Second layer of clad 640
Cladding head rotation point 650
First cladding head rotation arc 660
Second cladding head rotation arc 670
Optical center weaver 700
Laser beam 720
Beam bender 740
Motor 750
Focusing module 760
Laser fiber 770
Mirror 780
Base metal 800
Valley 810
Inside peak 820
Outside tube peak 830
Single bead 910
Inside side weave 920

Cladding is a welding process where another metal is metallurgically bonded on top of a base metal. The cladding process results in a thin layer of a pure metal on top of a transition zone containing both the clad material and the base material, followed by a layer of pure base material. The metallurgical bond is formed within the transition zone. Cladding of irregularly (non-flat) surfaces presents various challenges and opportunities. Cladding, as is welding, is most easily done on a flat surface with cladding applied in the direction of gravity. Irregular shaped surfaces, such as boiler waterwalls, are difficult to clad as many surfaces are sloped, resulting in potential run-off of the cladding material. The apparatus and methods described herein address these issues and provides for high quality, lower cost cladding of irregularly shaped, relatively planar metals structures. Relatively planar solid structures are defined herein as including objects such as sheet metal or panel, whether rectangle or other shape, that has an average length and width that is substantially greater than the average thickness or depth. As defined herein, relatively planar solid structures also include "panel shaped" structures with features that extend outside the plane. For examples, as defined herein, boiler waterwalls are relatively planar even though the waterwall panel is comprised of a series of tubes and has features that extend outside a strict plane. Waterwalls are made of a series of tubes that are connected to form a structure with the shape of a panel, generally flat, with a length and width component that is generally much greater than the thickness. Protrusions from each side of the panel, in the direction of the width may be in the form of a half tube shaped semi-circle, such as the case with waterwalls. Similarly, this apparatus and method may be used to clad structures with protrusions having another geometric shape, including but not limited to triangles, rectangles, etc. The salient point in defining a relatively planar structure is that the width and length dimensions of the structure is large in comparison to the width and that the relatively planar structure is stable when laid on a flat surface. Any structure that could be used to create a wall, floor or ceiling (such as corrugated metal or boiler waterwalls) would be considered to be relatively planar.

Boiler waterwalls are comprised of a series of parallel boiler tubes that are equally spaced, with the outer wall of each tube connected to the outer wall of another tube with a metal strip, such that the series of tubes and strips form a panel. In practice, hot (and often) corrosive gasses pass on one side of the panel, transferring heat to the tubes and ultimately to water within the interior of the tube to create steam.

Specific cladding materials, such as alloys, are selected for desired properties such as corrosion or erosion resistance. Boiler waterwalls are typically clad with nickel-based chromium alloys. As alloys can be very expensive, an economic advantage exists for the production of clad materials with relatively thin alloy thicknesses. Heat exchange equipment, thinly clad with alloys for corrosion resistance, have an additional advantage over thickly clad materials as alloys are often poor conductors of heat. The apparatus and methods described herein address these specific issues by producing clad layers as thin as 0.025 inches. Further, due to the low heat input associated with this cladding apparatus and method, the transition zone can be minimized to as little as 0.002 inches with a minimal heat affected zone. A small heat affected zone results in a stronger metal.

Information presented herein is divided into three basic subjects: the motion system, the weave technique, and the cladding head. The motion system includes such components as the gantry 130, carriage 160, and track 190. The primary objective of the motion system is to place the cladding head 220 in a desired position relative to the object to be clad. Once the cladding head 220 has been placed in the desired location, the weave technique is a function of the manner in which the cladding head 220 is moved and melting energy is applied to clad in a series of lines that result in cladding a strip. Two mechanical embodiments that control cladding head movement and positioning that affect weave technique are presented herein: a pendulum scanner that produces an oscillating side-by-side motion and a virtual pivot point system that combines motion along a gantry 130 coupled with a rotating motion. The virtual pivot system can also mimic the side-by-side motion produced by the pendulum scanner. Finally, information presented herein includes two basic cladding head configurations, an in-line cladding head and an optical center weaver 700.

Reference is made to FIG. 1 which illustrates a conceptual model of the motion system associated with the cladding process system 100. This embodiment of the system is comprised of a support surface, referred herein as the rotary table 110, to support, hold, and orient a relative flat or planar object below a movable gantry 130 that holds, supports, and moves, as needed, a cladding head 220. There is a carriage 160 that moves on the gantry 130, as needed. The cladding head 220 is attached to the carriage 160 along with the main rotary 170, the horizontal slide 180 and the vertical slide 210. The rotary table 110 may be tilted, as desired around a rotary table axis 120. A gantry 130 is mounted on the top side of the rotary table 110. It is elevated above the rotary table 110 by gantry supports 150. The gantry supports 150 are attached to the top side of the rotary table 110 via a track 190. The connection between the gantry support 150 and the track 190 is designed to allow controlled movement of the gantry 130 along the length of the rotary table 110. The connection between the gantry support 150 and the gantry 130 generally forms a right angle and the resultant elevation of the gantry (relative to the rotary table) may be fixed or alternative may be variable. A carriage 160 is connected to the gantry 130 so as to allow controlled movement of the cladding head 220 along the length of the gantry 130.

The carriage 160 is connected, directly or indirectly, to the main rotary 170. The main rotary 170 allows for maintaining the horizontal slide 180 in a controlled perspective, often relative to the horizon, by allowing movement of the horizontal slide 180 around that a rotary pivot point. In other embodiments, it may be desirable for the horizontal slide 180 to maintain a different perspective angle than parallel to the horizon. As mentioned previously, the rotary table 110 may be tilted around the rotary table axis 120. The main rotary 170 allows for maintaining the horizontal slide 180 at the desired angle relative to the horizon irrespective of the angle of the rotary table 110. As a result, the main rotary 170 allows control of the relative cladding angle, so that cladding can be performed at a desired angle relative to the surface of the workpiece; often it is desired to clad in the direction of gravity.

Figure 2:
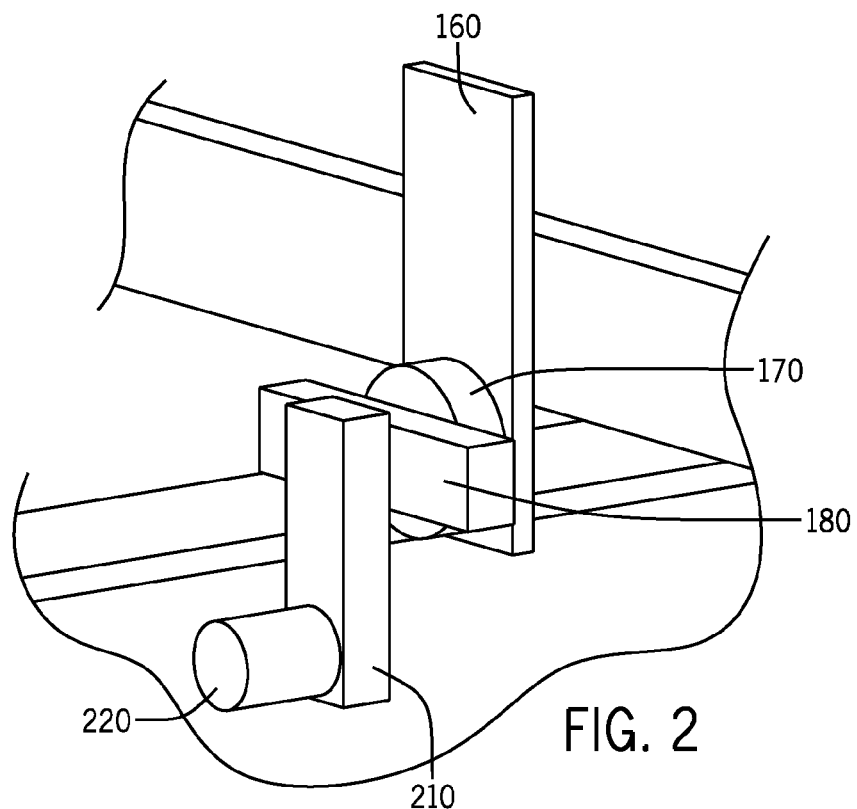
FIG. 2 shows a conceptual isometric side view of the motion system.

Referring now to FIG. 2 which shows further available range of motion in the conceptual model. The gantry 130, which lies above and parallel to the rotary table 110, is connected to a carriage 160, which has controlled movement along the length of the gantry 130. The horizontal slide 180 is connected to the carriage 160 via the main rotary 170, allowing control of the angle formed between the carriage 160 and horizontal slide 180. Attached to the horizontal slide 180 is the vertical slide 210 and the cladding head 220. The cladding head 220 is configured to have movement so as to allow cladding a line on a workpiece.

Figure 3:
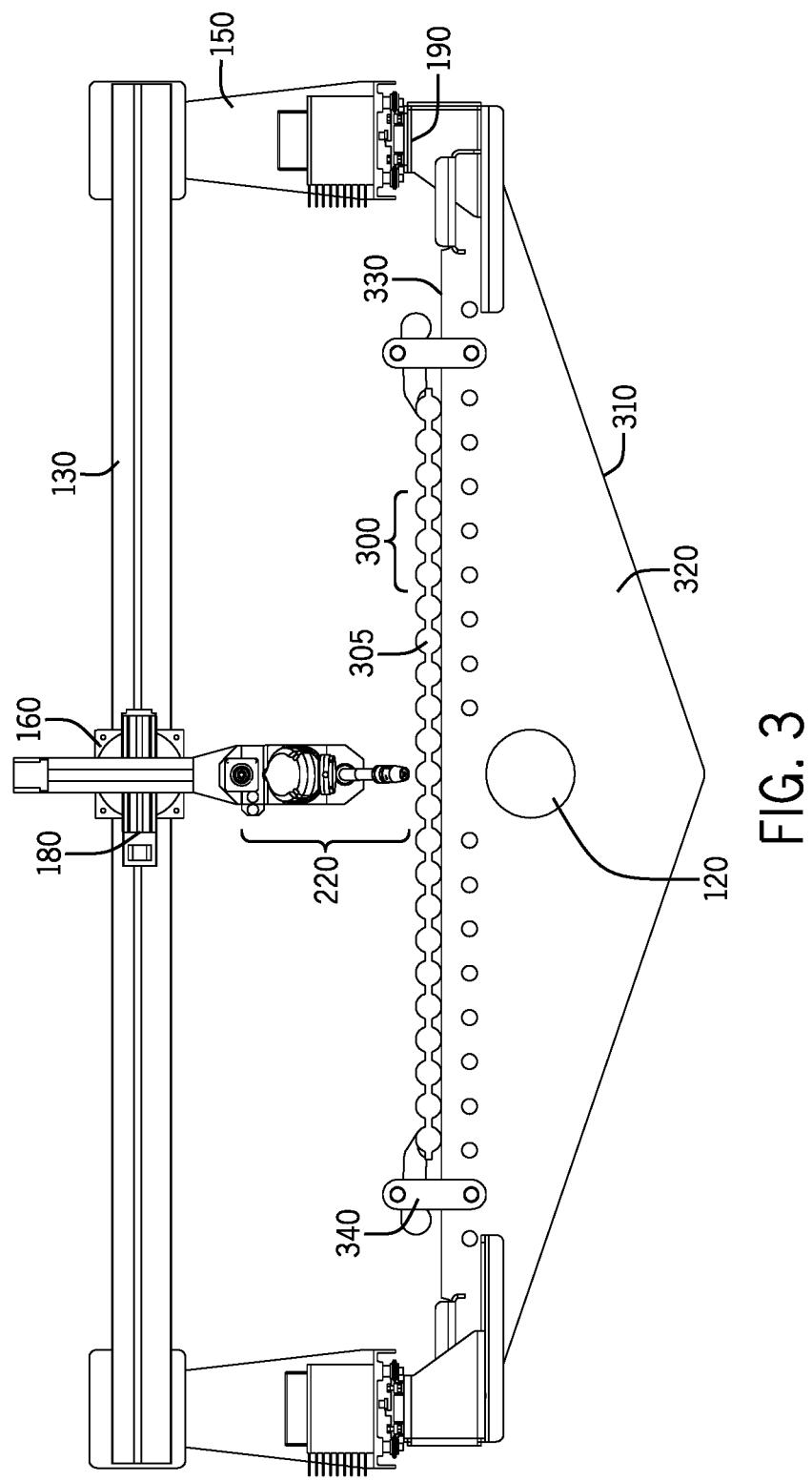
FIG. 3 shows a front view of a waterwall secured within the cladding system.

Reference is made to FIG. 3 which illustrates a more detailed front view of the cladding process system 100. FIG. 3 illustrates that the rotary table 110 may consist of a series of rotary table backbones 310 that support the workpiece, in this embodiment a boiler waterwall 300. In this embodiment, a series of rotary table backbones 310, considered together, form a rotary table 110. The rotary table 110 is formed by configuring the series of rotary table backbones 310 such that each backbone face 320, shown as a triangle in FIG. 3, fall into a plane that is parallel to the planes encompassing other backbone faces 320, the rotary table axis 120 passes through the center of each backbone face 320 and waterwalls 300 lay flat on the top of each backbone blade 330. The rotary table backbones 310 may be of different sizes, thickness and spacing with such dimensions only dependent on that which is required to support the object to be clad. The object to be clad, in this embodiment is a boiler waterwall 300 which is held down and secured with a clamp 340. Other securing embodiments known to person's knowledge of fastening technology may be employed. The rotary table 110 is modular. Rotary tables 110 of the same width can be joined together for longer waterwalls 300.

Continuing with FIG. 3, the cladding process system 100 is comprised of components previously identified in FIGS. 1 and 2. Gantry supports 150, are secured to a track 190, and support a gantry 130. A vertical slide 210, along with the cladding head 220 are connected to the gantry 130 via a carriage 160 coupled with a main rotary 170 (not shown) and a horizontal slide 180. As discussed previously, the combined effect of the motion system allows for the cladding head 220 to be place above the object to be clad across the entire area of the rotary table 110. Although not shown in the figure, cooling water (approximately 100-110° F.) is circulated through the tubes in the panel during the cladding process to control and maintain the temperature of the base metal to optimize the weld. Every tube has a parallel line from the water manifold.

Experience has shown that, where possible, it is highly desired to clad in the direction of gravity. Such is commonly referred to as the 1G position (which means perpendicular to the ground +/−15°. In one embodiment, the rotary table system 110 can be used to clad boiler waterwalls 300. In other embodiments, the rotary table system can be used to clad other generally planar objects with or without varying protrusions from the plane. Waterwalls are made of a series of tubes that are connected to form a structure with the shape of a panel, generally flat, with a length and width component that is generally much greater than the thickness. Protrusions from each side of the panel, in the direction of the width may be in the form a half tube shaped semi-circle, such as the case with waterwalls 300.

Figure 6A:
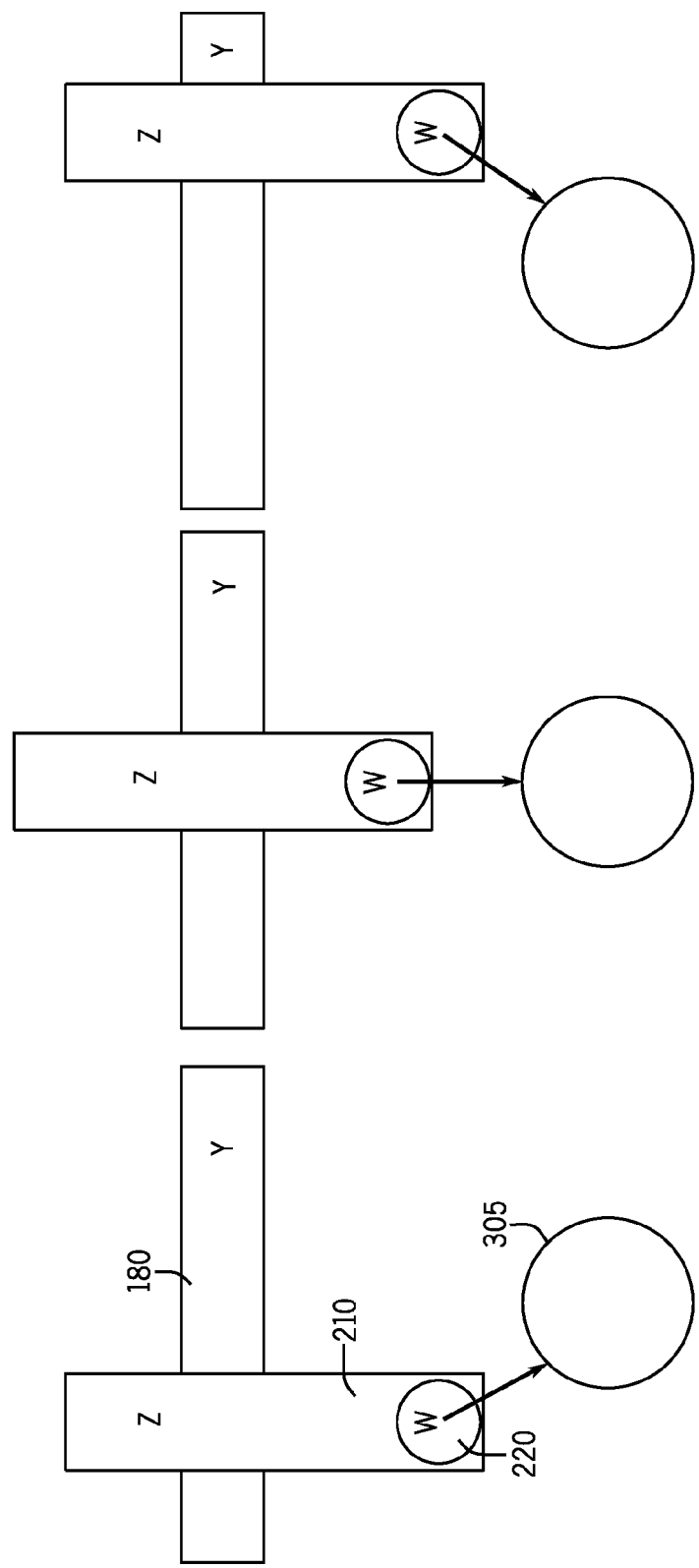
FIG. 6A shows a conceptual model that demonstrates the initial, middle, and final positions of the cladding head using a virtual pivot point.
Figure 6B:
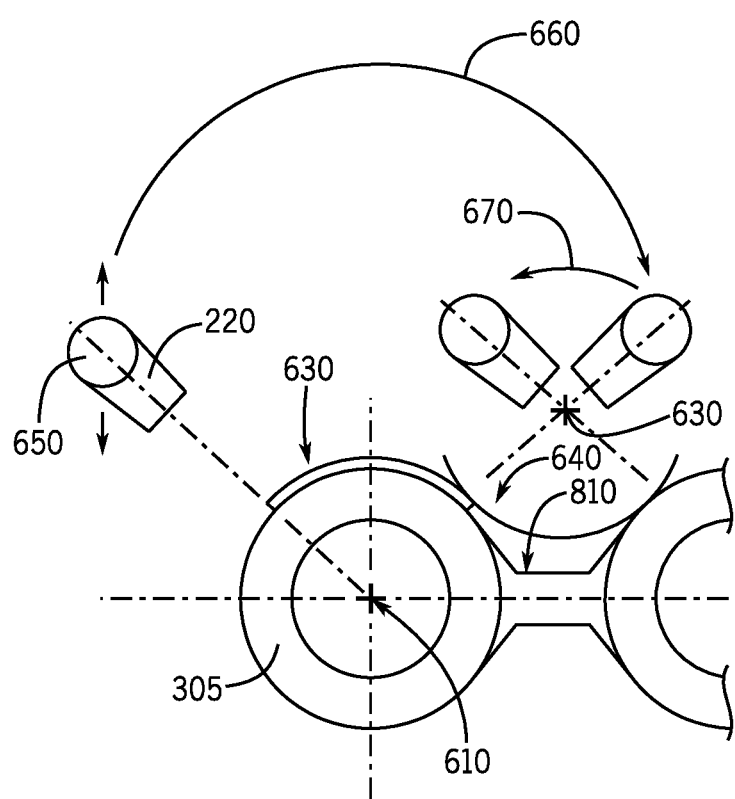
FIG. 6B shows a conceptual model that demonstrates shifting of virtual pivot points as cladding head moves from a tube to a valley.

FIG. 3, which utilizes a pendulum scanner 500, illustrates the ability to directly clad only a limited portion of the the top surface of the tubes 305 from the 1G position when the rotary table 110 is in the horizontal position. Other portions of the tube may not be clad directly in the direction of gravity when the rotary table 110 is horizontal as shown in FIG. 3. Although not depicted in FIG. 3, the weave could also be achieved by utilizing a virtual pivot point as illustrated in FIGS. 6A and 6B.

Figure 4A:
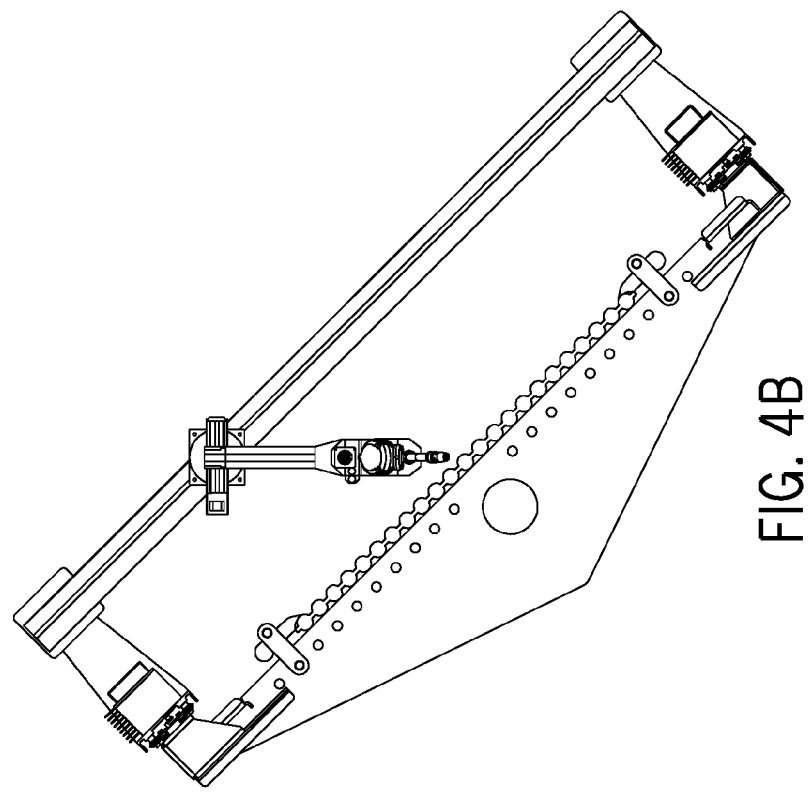
FIG. 4A and 4B shows the front views of the cladding system with the waterwall when they are in the tilted position.
Figure 4B:
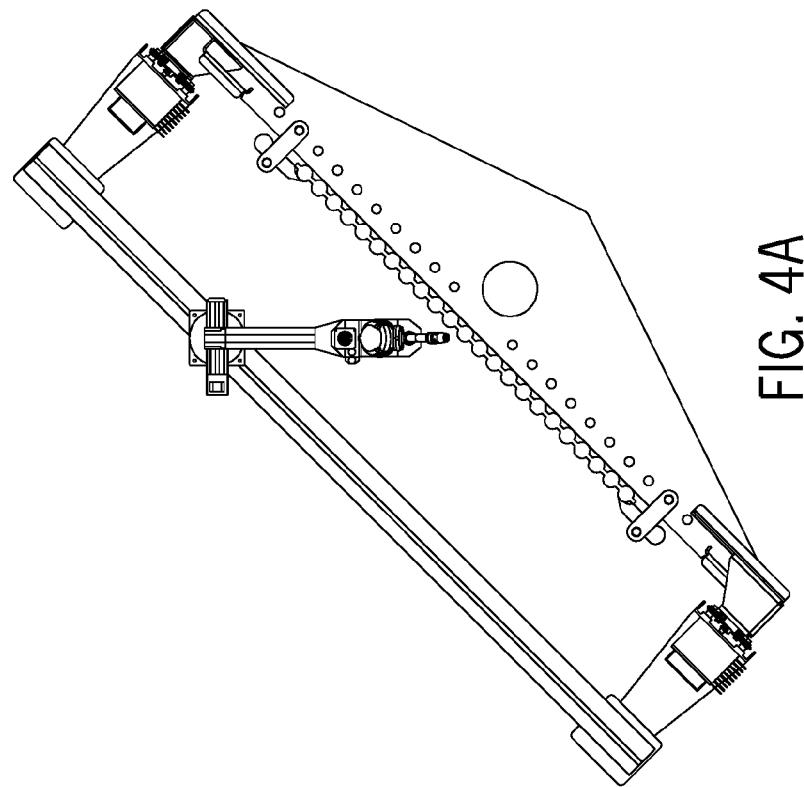

Now presenting FIG. 4A and 4B, which are identical to FIG. 3 except that the rotary table 110 is rotated around the rotary table axis 120 (no longer horizontal). Rotation of the rotary table 110 around the rotary table axis 120 coupled with rotation of the cladding head 220 around the main rotary 170 allows for direct placement of the cladding head 220 above other portions of the tube 305 and allows for cladding from the 1G position.

Various weaving techniques may be incorporated into the disclosed device and methods. This includes a linear weave, pendulum weave, virtual pivot weave, and weave shaping. Linear weaves simply involve laying lines of clad through movement of the cladding head 220 along the gantry 130 or horizontal side 180 without any other motion (such as the oscillating motion of the pendulum scanner). FIG. 5A conceptually presents the pendulum weave technique using a pendulum scanner 500. This figure illustrates that the vertical slide 210 is located just about the center of the tube (highest part of the curve) and the cladding head 220 sweeps from left to right to clad a line across the top of the top of the tube. When cladding other portions of the tube, the vertical slide 210 and the cladding head 220 are positioned overtop of the section of the workpiece to be clad. As a result, the working distance from the focus lens in the focusing module 760 (discussed later) to the point being clad is not necessarily the same at all points of the weave. At the end of the weaves, the cladding material melts before it touches the tube surface.

Figure 5B:
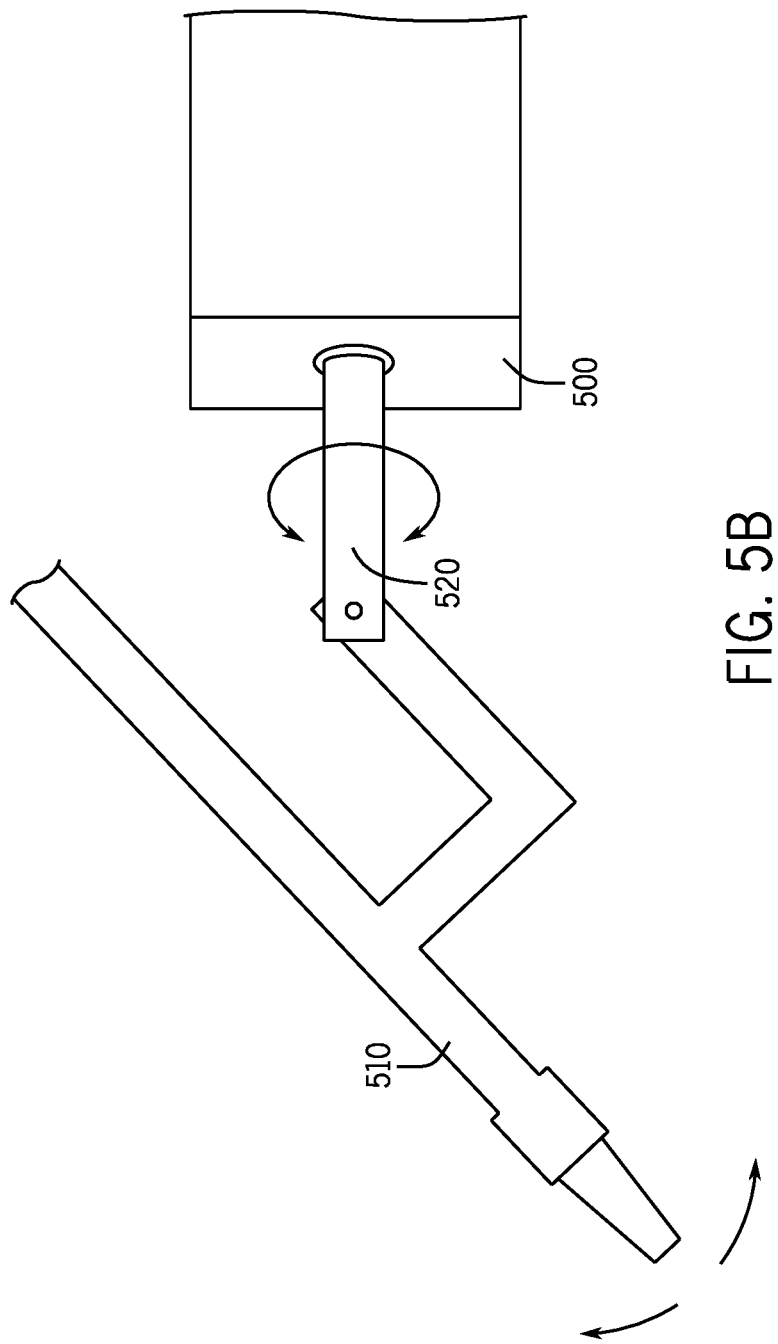
FIG. 5B shows a side view of a pendulum scanner.

The pendulum scanner 500 produces the side-by-side sweeps via an oscillating motion of the pendulum scanner oscillating axis 520. This oscillating motion is accomplished by partially rotating the oscillating axis 520 around its center in one direction followed by an equivalent partial rotation around its center in the other direction. FIG. 5B shows the pendulum scanner 500 and its oscillating axis 520, and demonstrates how this motion induces a side-by-side sweeping motion of the torch 510. Since the torch 510 is a part of the cladding head 220, the induced motion of the torch 510 causes a side-by-side motion of the cladding head energy source (e.g. a laser) that melts cladding material delivered by the torch 510; the two move together. The oscillating motion produces a side-by-side motion of both the torch 510, which is a cladding material delivery device, and the energy source for melting the cladding material (e.g. a laser) in unison.

After cladding a line, the motion system instructs the carriage 130 to move the cladding head 220 incrementally in the direction of bare (unclad) metal and the sweeping process, now likely right-to-left continues. This sequence of cladding a line and moving the cladding head 220 is repeated until the entire length of a tube is clad. After cladding a particular portion of the workpiece, the vertical slide 210 travels and orients the cladding head 220 over a different portion of the workpiece and the process is repeated. When cladding waterwalls, peaks, valleys and sides may be clad as individual passes. This process is repeated until all desired portions of the surface of the workpiece are clad.

The motion of the gantry 130 along the track 190 coupled with the motion of the cladding head 220 results in cladding a strip along the length of the workpiece. The width of the strip can be controlled to be as small as required; the "strip" can be a single bead (line) by eliminating the side-by-side oscillation. The weave width can be increased as long as the cladding material hits the melting energy (e.g. laser beam 720) just above the tube surface.

FIG. 6A conceptually presents a weave technique using a virtual pivot point. This figure demonstrates three separate but coordinated motions to facilitate placing the cladding head 220 just above and perpendicular to the tangent line to any surface of the workpiece. In summary, the cladding head 220 rotates and rises and falls as it travels across the length of the gantry 130.

The first figure (to the left) demonstrates the relative position of the cladding head 220 to a tube at the beginning the weave. Here the cladding head 220 is directed toward the furthest practical downside slope of the tube. Unlike the pendulum scanner, utilization of a virtual pivot point will often result in the cladding head 220 operating in a non-vertical position. As the tube is clad, from left-to-right, the vertical slide 210 will travel from left-to-right along the gantry 130 or the horizontal slide 180 and the cladding head 220 will rotate in a coordinated manner so as to maintain the cladding head, nearly as practical, perpendicular to the tangent line of the tube (at the point of cladding). The middle figure illustrates that when the center of the tube is reached, the cladding head 220 is pointing straight down in the direction of gravity and cladding the very top of the tube. The vertical slide continues to travel to the right and the cladding head 220 rotates, still pointing to the virtual pivot point, to maintain the direction of cladding at an angle perpendicular to the tangent line of the surface of the tube at the point of application. Unlike the pendulum scanner 500, the working distance from the focus lens in the focusing module 760 to the point being clad remains relatively constant at all points of the weave when cladding in-line with the virtual pivot point.

The virtual pivot point is not static and will move from time to time based on the topography of the surface being clad. The virtual pivot point is not to be confused with the point of rotation for the cladding head 650. In these embodiments, the claddings head 220 is attached to a vertical slide 210; whereas the cladding head 220 may be configured to rotate around a fixed point associated with the vertical slide 210, this may or may not be the virtual pivot point.

This concept is demonstrated in FIG. 6B. Considering the figure from left to right, the initial virtual pivot point 610 is located in the center of the tube. As the cladding head travels from left to right (due to motion along a gantry 130 or horizontal slide 180, not shown), the cladding head 220 must rotate around the cladding head rotation point 650 to maintain the direction of cladding so that it is perpendicular to the tangent of the tube surface at that point. That said, in this example, the cladding head 220 is always pointing at the center of the tube (i.e., the first virtual pivot point 610) until it approaches the valley (or membrane). However, in order to maintain a relatively constant distance between the cladding head 220 (especially the end of the torch 510) and the surface of the workpiece, the cladding head 220 may rise and fall vertically based of movement of the vertical side 210 (not shown). Making a single weave (line), while directing the cladding head constantly at a single virtual pivot point requires three simultaneous motions: generally horizontal movement of the cladding head 220 along the gantry 130 or horizontal slide 180, rotation of the cladding head 220 around a cladding head rotation point 650, and vertical movement, as needed to maintain a relatively constant distance between the cladding head 220 and the workpiece, along the vertical slide 210. When combined, these three motions result in motion of the cladding head rotation point 650 through the first cladding head rotation arc 660. While pivoting around the first pivot point 610, a continuous layer of clad 620 is laid across the top of a tube.

Sometime prior to reaching the valley 810, the virtual pivot point must shift to another location, this time a second pivot point 630, located at a point in space above the valley 810. Although this point may be close to the cladding head rotation point 650, they are not necessarily the same. In this example, the horizontal motion ceases (or is minimal) and the cladding head 220 pivots through a second pivot point 630 by rotating and moving the cladding head rotation point 650 through the second cladding head rotation arc 670, resulting in a continuous layer of clad 640 above a valley 810.

At this point, the cladding head 220 is in the exact same position as previously described, but in reference to the adjacent tube. Cladding with this approach can result in a continuous clad across the entire workpiece; to be successful, the switch of virtual pivot point must occur at a location where the resultant clad would be a part of the first arc of clad on top of the tube 620 and part of the second arc of clad in the valley 640. To be of greatest benefit, the switching of pivot points must occur without cessation of cladding and the "two clads" must be seamless.

After cladding a line, the motion system instructs the carriage 130 to move incrementally in the direction of bare (unclad) metal and the process of rotating the cladding head 220 and moving the vertical slide 210 is repeated. This could be accomplished by reversing direction with a right-to-left motion, or returning back to the left and cladding in a left-to-right motion. This sequence of cladding a line and moving the cladding head 220 is repeated until the entire length of a tube is clad. After cladding a particular portion of a tube, the cladding head 220 travels to another portion of a tube and the process is repeated. This process is repeated until all desired portions of the surface of the workpiece are clad.

Considering the motion of the gantry 130 along the length of the track 190, the generally horizontal (or widthwise) movement or the carriage 160 along the length of the gantry 130, coupled with the pivoting motion around the virtual pivot point, the cladding process system creates a strip of clad alloy along the length of the workpiece. The width of the strip can be controlled to be as small as required; it could be a single bead or line. In this embodiment, the maximum width, when cladding around a single virtual pivot point is limited by the presence of the adjacent tube or an inflection in the surface of the structure.

The maximum width can be the entire width of the workpiece if multiple (and shifting) virtual pivot points are used and the peak, valleys and sides are clad as one continuous pass. In that embodiment, the workpiece is clad across its entire width. As such, the vertical side could travel from one end of the gantry 130 to the other end of the gantry 130 in one widthwise motion; the cladding head 220 would pivot, as needed to maintain the head alignment perpendicular to the surface being clad.

Cladding in positions other than 1G is possible, but more difficult. Embodiments disclosed herein include weave shaping techniques which include laser beam spot shape control, laser beam power modulation, and laser beam stirring. Laser beam power modulation which is accomplished by varying the laser power in time by amplitude or pulse width modulation ("PWM"). Use of these techniques allows varying the strength of the laser at different points of the weave (lower power at the ends compared to the center of the weave). These techniques reduce the amount of energy input into the cladding material (compared to cladding at 1G) resulting in less melt mass per unit time. Where welding/cladding is being performed on a sloped surface, as demonstrated in the left and right figures in FIG. 6, energy modulation allows for proper bonding to occur on sloped surfaces by preventing cladding material from running too quickly down the sloped surface. Said another way, modulation of the energy input to the cladding material results in less energy input per mass per time, less melting mass per time, resulting in shorter and smaller puddles of melted clad material, allowing for surface attractions to overcome the effects of gravity, holding these small puddles in place long enough to bond. In addition, uses of laser beam modulation can help to induce a stirring effect that decreases potential defects in the weld. The left and right multi-G examples are contrasted against the center figure which is performed at the 1G position. Use of energy modulation techniques can minimize or eliminate the need for welding in the 1G position, or otherwise can increase the speed of cladding when in the 1G position.

Additional control of the welding/cladding process can be achieved through laser beam spot shape control where the round laser spot is transformed to an oval spot or other geometry. This is accomplished by using alternate optics in the cladding head to shape the beam. For example, an oval is created with a cylindrical lens. Segmented optical lens or diamond turned facets can be used to create beam spot patterns. This can help by improving the shape of the molten puddle; the heat flow out of the molten zone may require more heat on the sides of the beam rather than adding up to high in the center.

Another technique that can be used to improve the clad or weld is laser beam stirring. This technique requires using a smaller laser beam to fill out a larger spot or shape at a high speed such that it stirs the molten puddle. This may improve the weld or clad by slinging out inclusions or potential defects. Stirring helps to bring slag to the top of the puddle rather than disturb the bond interface.

Figure 8:
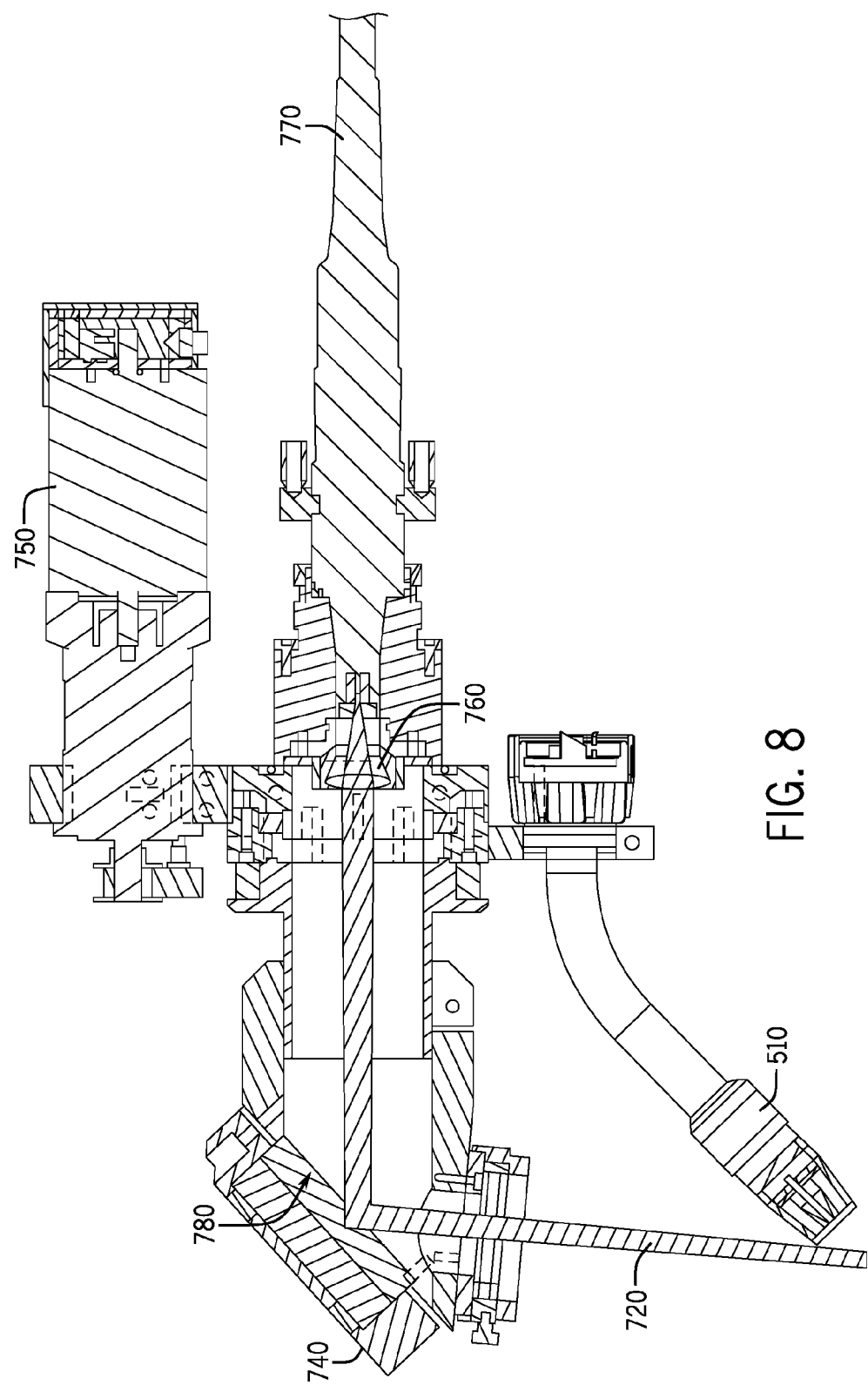
FIG. 8 shows a sectional side view of the cladding device.

FIG. 7A illustrates a side view of a laser cladding device. Laser cladding devices may operate with an in-line cladding head, or as illustrated in FIG. 7A, 7B and 8, may operate as an optical center weaver 700. The in-line device operates just as the term describes; a laser energy is received from a laser fiber 770 which is connected to the top of the device (which is in the shape of a tube) and the energy passes "in-line" until it exits at the bottom (where it intersects with the cladding material delivered by the torch 510). A water cooled fiber optic cable delivers the laser beam (from its source) to the head through the fiber. The energy leaving the laser fiber is focused by a lens (in this example a water cooled bi-convex lens) located within the focusing module 760, resulting in a focused, high-energy beam 720 that is projected to the base clad surface where it meets the cladding material delivered by the torch 510.

The optical center weaver 700, illustrated in FIGS. 7A, 7B, and 8, has all the same features as the in-line except it has a beam bender 740 and a motor 750. The beam bender 740 is adjustable and water cooled and has a highly reflective mirror 780 that reflects the laser beam on to the clad surface at a set angle. The motor 750 facilitates a side-by-side motion (similar in results to the pendulum scanner as shown in FIG. 5A); alternatively optical centered weaver may operate using a pivot motion in unison with the vertical and horizontal slide (as illustrated in FIG. 6). The motor 750 is used to used to move the mirror 780 in such a way that the focused laser beam 720 dithers from side to side resulting in a line. In one embodiment, a digitally controlled Servo motor is used to rotate the mirror sufficiently to cause the laser point to move across the workpiece. Unlike the pendulum scanner, this side-by-side motion can be achieved, forming a line of clad with the optical centered weaver 700 without otherwise moving the cladding head 220.

This embodiment also incorporates a torch 510 that is attached in a fixed position into the optical centered weaver 700. The torch 510 is a hollow cylinder shaped cladding material delivery and heating device. The outlet of the torch 510 is in a fixed position such that the cladding material leaving the torch 510 intersects with the laser beam 720 just above the surface to be clad. As a result, the optical centered weaver 700 could be portable, that is not connected to a cladding process system 100 as described previously. When cladding with the optical centered weaver 700, any surface on any object can be clad if means exist to position the end of the cladding head above the surface of the workpiece such that the laser beam 720 intersects with the cladding material (delivered by the torch 510) just above the surface of the workpiece and melting energy is modulated as needed to account for irregular shapes and slops and weaving speed.

The optical center weaver 700 has two additional advantages over an in-line cladding head. First, given the configuration and the desired motions, the position of the laser fiber remains relatively constant when compared to the in-line cladding head, especially when coupled with cladding around a virtual pivot point. Secondly, the motor facilitates much faster weaving speeds since the optical center weaver 700 has greater capability in reaching and cladding sloped surface without stopping to make positional adjustments (e.g., wider strips, faster oscillations).

In the embodiment presented in FIGS. 7A and 7B, the cladding material is a hot wire that is melted by laser fusion. Other process embodiments are available such as cold wire or powder laser fusion, hot or cold wire or powder laser key hold welding, combinations or wire and powder, and laser hybrid welding where the laser beam and the electrical arc act simultaneously on the same weld puddle). Lasers incorporated in the cladding process system can include fiber lasers, diode lasers, fiber delivered diode lasers and carbon dioxide lasers. Optics associated with the laser could be refractive, reflective, or diffractive.

The embodiment presented in FIGS. 7A and 7B utilize hot wire as a cladding material. In this embodiment, hot wire is heated as it passes through the torch 510 via AC (alternate current) electrical resistance. Other heating embodiments include electrical resistance heating via DC (direct current) heating or pulsed heating, radio frequency, small furnace, plasma, optical, laser, or a hybrid of any other previously mentioned heating methods.

Returning to FIGS. 7A and 7B, heated wire is fed through the torch 510 so that the hot wire intersects the laser beam 720 just above the point to receive the cladding material. The hot wire may be heated to the plastic point so that the energy requirements to melt the wire with the laser are minimized. Otherwise, the cladding material (wire or powder) may be cold or partially heated. The hot wire feeder and the laser beam are configured to move together in unison giving the device a compact design; the wire and the beam stay together as the cladding head 220 moves.

Now presenting FIG. 8, which illustrates a side sectional view of the optical center weaver 700. Consistent with FIGS. 7A and 7B, a laser beam is shot down the center of the optical center weaver 700 to the mirror 780 that redirects the laser beam to a common point where the hot wire is delivered by the torch 510. A clear advantage of the disclosed device is the compact design, combining the laser source and beam and clad material feeder and keeping the hot wire and beam together despite manipulation of the cladding head. The optical center weaver 700, as disclosed herein, allow for optimal beam shaping and scanning, with beam center rotation.

FIGS. 9 through 12 demonstrate one example of the "weaving" process used to clad a waterwall where the entire workpiece is clad via a series of strips. Cladding strips, as described below, may be laid down through use of an in-line or optical center weaver 700, coupled with either a pendulum scanner or a virtual pivot. Alternatively, a workpiece can be clad by using the vitural pivot method with or without rotation of the table and workpiece. In these examples, a series of strips and beads of clad are laid on the workpiece so that the area to be clad is fully covered. These strips and beads are laid adjacent to one another with a small overlap to assure continuity of the cladding and when combined, result in a continuous layer of cladding. In another example of weaving, the entire width of the workpiece can be clad as described previously utilizing a virtual pivot point.

FIG. 9A illustrates the first steps in the clad sequence to clad the base metal 800 on and between the outermost two adjacent tubes on one side of a waterwall 300 through cladding a series of strips. After securing the waterwall 300, the first step is to clad the valley 810 between the two outermost tubes followed by cladding the inside peak 820 on the second outermost tube with the rotary table 110 in the horizontal position (as shown in FIG. 3). Cladding of the valley 810 and the inside peak 820 can be accomplished in the 1G position when the rotary table 110 is in the horizontal position. The entire width of the valley 810 is clad as a result of the side-to-side movement of the cladding head, previously described. The entire length of the valley is clad as a result of the movement of the gantry 130 along the entire length of the track 190. The entire length of the cladding on the inside peak 820 is applied by the same motions described for the valleys 810.

Step 2 is presented in FIG. 9B. After the cladding is laid down as indicated in FIG. 9A, the rotary table 110 is tilted between 10°-75° with a preferred angle of between 10°-14° with a best mode being approximately 12°. Cladding is now applied to the outermost tube peak 830 in such a way that it reaches between the 1-3 o'clock positions, with the best mode being 2 o'clock while maintaining the same wire height on both sides of the weave. The wire should hit the laser beam just above the clad surface. Cladding of this portion of the outside tube could fall just outside a 1G position.

Step 3 is presented in FIG. 10A. After the cladding is laid down as indicated in FIG. 9B, the rotary table 110 is tilted between 10°-75° with a preferred angle of between 35°-45° with a best mode being approximately 40°. Also see FIG. 10A for reference. Here a first bead 910 is laid down at the point that the valley 810 meets a tube located on the down slopping side wherein half of the single bead should be on the edge of the corresponding valley. The bead 910 is an important feature of the weaving sequence as it improves the tie between the valley 810, the second inside weave 920 (discussed below) and the base metal. The bead 910 is clad down the entire length of the waterwall. Rotation of the table, as described herein, allows for the bead 910 to be laid down from the 1G position.

Step 4 is presented in FIG. 10B. The rotary table 110 is tilted between 10°-75° with a preferred angle of between 40°-50° with a best mode being approximately 45°, results in a tube surface capable of cladding in the 1G position. After the cladding is laid down as indicated in FIG. 10A, the first inside weave 920, located adjacent to the first bead 910, is clad down the entire length of the waterwall 300.

Following cladding of the first inside weave 920, the rotary table 110 is tilted in the other direction between 10°-75° with a preferred angle of between 35°-45° with a best mode being approximately 40°. Also see FIG. 4B for reference. A second bead 910 is laid down at the point that the valley 810 meets a tube on the (now) down slopping side, followed by a second inside weave 920 as was performed previously when the table was titled in the other direction. FIG. 10C illustrates the cladding on adjacent tubes as clad in the above sequence.

Figure 11A:
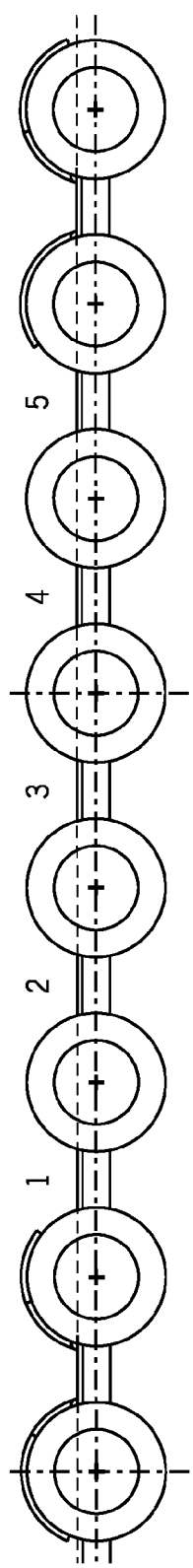
FIGS. 11A and 11B show the best mode sequence for cladding the remainder of the valleys and peaks in the horizontal position.
Figure 11B:
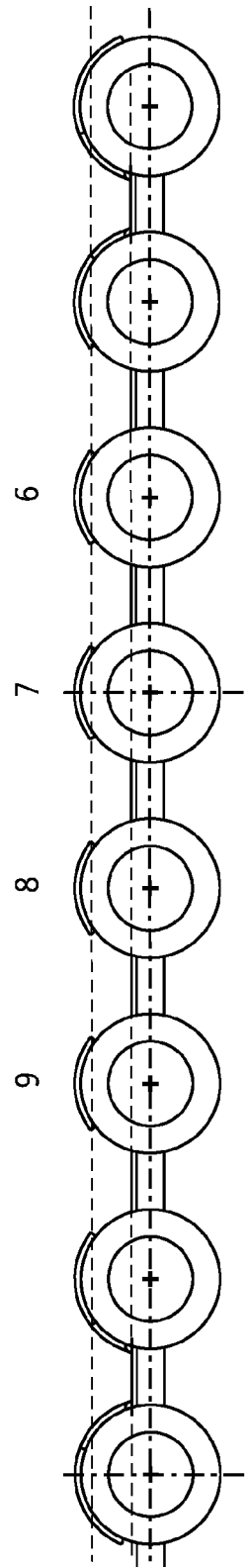
Figure 12B:
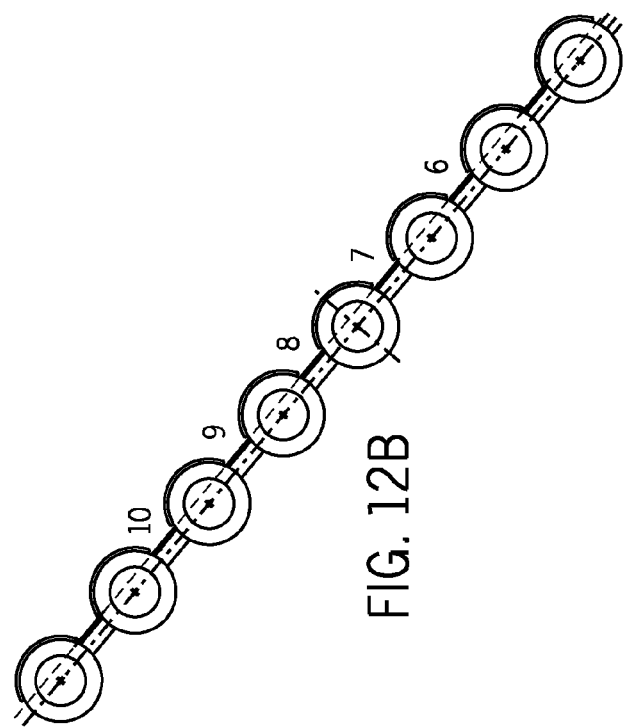
FIG. 12A and 12B show the subsequent best mode sequence for cladding the remainder of the sides while at an angle to the horizontal position.
Figure 12A:
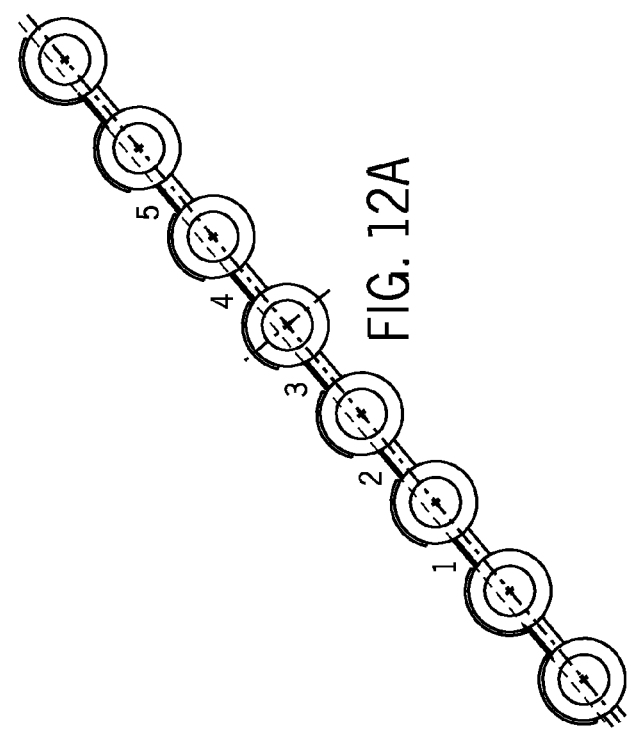

Although the clad sequence could vary and produce an equivalent product, FIG. 11A and 11B coupled with FIG. 12A and 12B illustrates the best mode for cladding the remainder of the valleys and peaks (in the horizontal position) and the remainder of the sides (while at an angle to the horizontal position). First, all of the valleys 810 are clad, one after another, going left to right, or right to left. After all the valleys 810 are clad, all the peaks 820 are clad in the opposite direction as indicated in FIG. 11B. FIG. 12A illustrates that next, all the downside linear beads 910 and inside weaves 920 are clad in sequence when the rotary table 110 is tilted in one direction, and that the other downside linear beads 910 and inside weaves 920 are clad in sequence when the rotary table 110 is tilted in the other direction. The steps discussed herein are used to clad the remainder of the panel.

The clad sequence described herein relates directly to cladding an object with the layout of boiler waterwalls 300. This sequence reflects an optimal solution by minimizing the time required to clad the waterwall 300. Time minimization is accomplished by minimizing non-cladding time and movement. Other equivalent or near equivalent sequences may exist. For example, the waterwall could be produced by cladding left-to right (or right-to left), alternately cladding inside peak—valley—inside peak—valley, etc, rather than sequentially cladding all the valleys 810 followed by all the inside peaks 820. Such an alternate sequence example is disclosed herein, however has the disadvantage of additional setup time and panel distortion. Other examples would include any permutations associated with cladding the identified sections of the waterwall 300.

The apparatus and method described herein has multiple moving parts and requires implementation of steps in preplanned and coordinated fashion. For example, in laying down a strip of clad, it is necessary to coordinate successive lying down of lines, followed by incremental movement of the gantry 130 along the track 190. Upon cladding a strip, the apparatus and method require movement of the cladding head 220 along the horizontal length of the gantry 130 to position the cladding head 220 so as to repeat the sequence and lay another series of lines forming a strip. Under various embodiments the rotary table is rotated to expose bare metal to the 1G position. Finally, cladding around a virtual pivot point requires simultaneous horizontal movement of the cladding head 220 along the gantry 130 or the horizontal slide 180 while pivoting the cladding head to form a different angle (to the horizon) to maintain the cladding head at a position that is perpendicular to the tangent line on the surface being clad. All these motions require a control system with programmable logic to coordinate the efficient movement as described above. Means for such movement is accomplished through uses of geared systems and motors, or the equivalent, unless otherwise specified.

Considering the above disclosure, the cladding process system 100 has several distinguishing features. These include a motion system to provide cladding head 220 access, wherever possible in the 1G weld position (in reference to the object to clad). When not possible to clad in the 1G position, the cladding process system 100 provides for controls, processes and method to perform multi-G welding. The cladding process system 100 also incorporates a control system to control, track and monitor cladding performance in a pre-determined sequence utilizing motion controllers, software, data collection quality reports, necessary inputs/outputs, and a user (operator) interface, (mechanical, electrical, and/or optical) tracking systems. Finally the cladding process system 100 utilizes structures to hold and orient the object to be clad (rotary table 110, rotary table backbone 310, and clamp 340).

Cladding using this device and method has the advantage of producing a uniformly thin layer of cladding while minimizing the thickness of the metallurgical bond (interface). Thin, uniform cladding, minimizing the interface has the advantage of lower cost (less expensive alloy) and stronger welds. Although thicker layers are achievable if desired, cladding thickness is always controllable to less than 0.070 inches with typical thicknesses of 0.055 inches, with minimum thickness of 0.020 inches being of within ten percent dilution of cladding alloy.

We claim:

1. A laser cladding device for cladding a metal surface comprising:
   a. a laser;
   b. a hollow cylinder shaped vessel that surrounds the laser energy;
   c. a fiber optical cable that delivers said laser energy to a first end of said hollow cylinder;
   d. a focusing lens, located within said hollow cylinder, that receives said laser and focuses it, producing a focused laser beam;
   e. a mirror that redirects said focused laser beam;
   f. a second end of said hollow cylinder which is located in the direction of said redirected focused laser beam;
   g. a torch;
   h. wherein said torch heats a cladding material; and
   i. said torch is mounted in a fixed position, wherein said heated cladding material exits said torch at a point that intersects with said redirected focused laser beam.

2. The laser cladding device of claim 1 further comprising a motor that rotates said mirror to produce a side-by-side motion of said redirected focused laser beam.

3. The laser cladding device of claim 1 wherein the focusing lens is selected from the group consisting of refractive, reflective, or diffractive optics.

4. The laser cladding device of claim 1 wherein the relative angle of change of the redirected focused laser beam induced by said mirror is between 30° and 120°.

5. The laser cladding device of claim 1 wherein the fiber optic fiber is water cooled.

6. A laser cladding device for cladding a metal surface comprising:
   a. a laser;
   b. a hollow cylinder shaped vessel that surrounds the laser energy;
   c. a fiber optical cable that delivers said laser energy to a first end of said hollow cylinder;
   d. a focusing lens, located within said hollow cylinder, that receives said laser and focuses it, producing a focused laser beam;
   e. a beam bender that redirects said focused laser beam;
   f. a second end of said hollow cylinder which is located in the direction of said redirected focused laser beam;
   g. a torch that heats a cladding material wherein heated cladding material exits said torch at a point that intersects with said redirected focused laser beam.

7. The laser cladding device of claim 6 further comprising a motor that rotates said beam bender to produce a side-by-side motion of said redirected focused laser beam.

8. The laser cladding device of claim 6 wherein the focusing lens is selected from the group consisting of refractive, reflective, or diffractive optics.

9. The laser cladding device of claim 6 wherein the beam bender comprises a component that is a refractive, reflective, or diffractive optic.

10. The laser cladding device of claim 6 wherein the relative angle of change of the redirected focused laser beam induced by said beam bender is between 30° and 120°.

11. The laser cladding device of claim 6 wherein the beam bender comprises a mirror.

* * * * *